(12) United States Patent
Jiang (10) Patent No.: US 8,131,582 B2
(45) Date of Patent: Mar. 6, 2012

(54) APPLICATION OF DISCRETE CHOICE THEORY TO FORECASTING AIRCRAFT RETIREMENTS AND FLEET COMPOSITION

(75) Inventor: Helen Jiang, Bellevue, WA (US)

(73) Assignee: The Boeing Company, Chicago, IL (US)

(*) Notice: Subject to any disclaimer, the term of this patent is extended or adjusted under 35 U.S.C. 154(b) by 1098 days.

(21) Appl. No.: 11/969,529

(22) Filed: Jan. 4, 2008

(65) Prior Publication Data

US 2009/0177506 A1 Jul. 9, 2009

(51) Int. Cl.
*G06F 17/00* (2006.01)
(52) U.S. Cl. ................................. 705/7.31
(58) Field of Classification Search .............. 705/7.31, 705/7.13
See application file for complete search history.

(56) References Cited

U.S. PATENT DOCUMENTS

| | | | |
|---|---|---|---|
| 6,732,063 B2* | 5/2004 | Famili et al. | 702/188 |
| 6,799,154 B1* | 9/2004 | Aragones et al. | 703/22 |
| 2004/0172229 A1* | 9/2004 | Aragones et al. | 703/8 |
| 2006/0095306 A1* | 5/2006 | Parker et al. | 705/7 |
| 2006/0224482 A1* | 10/2006 | Aragones et al. | 705/35 |

OTHER PUBLICATIONS

Jiang et al., "An Analysis of Airplane Retirement," 6th AIAA Aviation Technology, Integration and Operations Conference (ATIO), Wichita, Kansas, Sep. 25-27, 2006.
Jiang et al., "An Analysis of Profit Cycles in the Airline Industry," MIT International Center for Air Transportation, Report No. ICAT-2004-7, Dec. 2004.

* cited by examiner

*Primary Examiner* — Thomas Dixon (57) ABSTRACT

An apparatus and method for forecasting aircraft fleet composition, aircraft retirements and fleet spares requirements, includes obtaining aircraft fleet data, obtaining data on independent variables, determining a cycle indicator, determining the operation type of the aircraft, estimating the model using certain estimation steps using the aircraft fleet data, examining and updating the model based on changes in the independent variables, and forecasting on a year-to-year basis by age and operation cohort.

13 Claims, 7 Drawing Sheets

| CHOICE | AGE | PAX | CYCLE | SHOCK | OILPRICE | SUNSET | av1 | av3 | av4 | MODEL | SERIAL | DELIVERYYEAR | YEAR | STATUS |
|---|---|---|---|---|---|---|---|---|---|---|---|---|---|---|
| 1 | 0 | 1 | 0.31 | 0 | 36.83 | 0 | 1 | 1 | 1 | MD80/90 | 48002 | 1980 | 1980 | IN SERVICE |
| 1 | 1 | 1 | 0.31 | 1 | 35.93 | 0 | 1 | 1 | 1 | MD80/90 | 48002 | 1980 | 1981 | IN SERVICE |
| 1 | 2 | 1 | -0.61 | 1 | 32.97 | 0 | 1 | 1 | 1 | MD80/90 | 48002 | 1980 | 1982 | IN SERVICE |
| 1 | 3 | 1 | -1.00 | 0 | 29.55 | 0 | 1 | 1 | 1 | MD80/90 | 48002 | 1980 | 1983 | IN SERVICE |
| 1 | 4 | 1 | -0.81 | 0 | 28.78 | 0 | 1 | 1 | 1 | MD80/90 | 48002 | 1980 | 1984 | IN SERVICE |
| 1 | 5 | 1 | -0.31 | 0 | 27.56 | 0 | 1 | 1 | 1 | MD80/90 | 48002 | 1980 | 1985 | IN SERVICE |
| 1 | 6 | 1 | 0.31 | 0 | 14.43 | 0 | 1 | 1 | 1 | MD80/90 | 48002 | 1980 | 1986 | IN SERVICE |
| 1 | 7 | 1 | 0.81 | 0 | 18.44 | 0 | 1 | 1 | 1 | MD80/90 | 48002 | 1980 | 1987 | IN SERVICE |
| 1 | 8 | 1 | 1.00 | 1 | 14.92 | 0 | 1 | 1 | 1 | MD80/90 | 48002 | 1980 | 1988 | IN SERVICE |
| 1 | 9 | 1 | 0.81 | 1 | 18.23 | 0 | 1 | 1 | 1 | MD80/90 | 48002 | 1980 | 1989 | IN SERVICE |
| 1 | 10 | 1 | 0.31 | 0 | 23.79 | 0 | 1 | 1 | 1 | MD80/90 | 48002 | 1980 | 1990 | IN SERVICE |
| 1 | 11 | 1 | -0.31 | 0 | 20.00 | 0 | 1 | 1 | 1 | MD80/90 | 48002 | 1980 | 1991 | IN SERVICE |
| 1 | 12 | 1 | -0.81 | 0 | 19.32 | 0 | 1 | 1 | 1 | MD80/90 | 48002 | 1980 | 1992 | IN SERVICE |
| 1 | 13 | 1 | -1.00 | 0 | 18.97 | 0 | 1 | 1 | 1 | MD80/90 | 48002 | 1980 | 1993 | IN SERVICE |
| 1 | 14 | 1 | -0.61 | 0 | 15.82 | 0 | 1 | 1 | 1 | MD80/90 | 48002 | 1980 | 1994 | IN SERVICE |
| 1 | 15 | 1 | -0.31 | 0 | 17.02 | 0 | 1 | 1 | 1 | MD80/90 | 48002 | 1980 | 1995 | IN SERVICE |
| 1 | 16 | 1 | 0.31 | 1 | 20.67 | 0 | 1 | 1 | 1 | MD80/90 | 48002 | 1980 | 1996 | IN SERVICE |
| 1 | 17 | 1 | 0.81 | 1 | 19.08 | 0 | 1 | 1 | 1 | MD80/90 | 48002 | 1980 | 1997 | IN SERVICE |
| 1 | 18 | 1 | 1.00 | 1 | 12.72 | 0 | 1 | 1 | 1 | MD80/90 | 48002 | 1980 | 1998 | IN SERVICE |
| 1 | 19 | 1 | 0.81 | 0 | 17.97 | 0 | 1 | 1 | 1 | MD80/90 | 48002 | 1980 | 1999 | IN SERVICE |
| 3 | 20 | 1 | 0.31 | 0 | 28.50 | 1 | 1 | 1 | 1 | MD80/90 | 48002 | 1980 | 2000 | PARKED |
| 3 | 21 | 1 | -0.31 | 0 | 24.44 | 1 | 1 | 1 | 1 | MD80/90 | 48002 | 1980 | 2001 | PARKED |
| 1 | 22 | 1 | -0.81 | 0 | 25.02 | 1 | 1 | 1 | 1 | MD80/90 | 48002 | 1980 | 2002 | IN SERVICE |
| 1 | 23 | 1 | -1.00 | 0 | 28.83 | 1 | 1 | 1 | 1 | MD80/90 | 48002 | 1980 | 2003 | IN SERVICE |
| 1 | 24 | 1 | -0.81 | 0 | 38.27 | 1 | 1 | 1 | 1 | MD80/90 | 48002 | 1980 | 2004 | IN SERVICE |
| 1 | 25 | 1 | -0.31 | 0 | 54.52 | 1 | 1 | 1 | 1 | MD80/90 | 48002 | 1980 | 2005 | IN SERVICE |
| 1 | 26 | 1 | 0.31 | 0 | 65.14 | 1 | 1 | 1 | 1 | MD80/90 | 48002 | 1980 | 2006 | IN SERVICE |

APPLICATION OF DISCRETE CHOICE THEORY TO FORECASTING AIRCRAFT RETIREMENTS AND FLEET COMPOSITION

TECHNICAL FIELD

The present disclosure relates generally to vehicle retirements and a composition of the group of vehicles. More particularly, the disclosure relates to forecasting of aircraft retirements and fleet composition.

BACKGROUND OF THE DISCLOSURE

The air transportation industry has experienced rapid growth in the past three and a half decades. The world commercial jet fleet has grown from approximately 3,000 aircraft in 1970 to more than 15,000 aircraft in 2005. Over that period, dozens of aircraft models were introduced into the market to become the mainstay for air transportation services, while other models were retired by newer and better products and eventually went out of service. Aircraft retirements and replacements are amongst the major factors driving demand for new aircraft.

Currently and in the past, there has been a problem of predicting the fleet of vehicles that are in service and the inventory of their spare parts. This is especially a problem in more expensive vehicles such as aircraft that are maintained longer in service as compared to lower priced vehicles such as automobiles.

There are no existing solutions for forecasting the retirements of the aircraft and the fleet composition of the aircraft. Especially, there is no existing forecasting technique that is able to predict the annual fleet size and retirements by the delivery year and/or operation type of the aircraft.

Airlines currently may make a rough estimate of what they need based on a very inaccurate means of estimation. For example, they may determine that a certain air vehicle is beginning to show its age, so they may allocate funds to cover maintenance of the air vehicle over future years, but may later discover that the aircraft is in proper working condition. Meanwhile they may have already ordered spares for the aircraft and/or discovered that it is another type of aircraft that needs spares for maintenance. Therefore, the airline may lose money by stocking more spares than necessary or not be able to accommodate for the spare parts for the air vehicles they do have in service because of an improper use of the resources available. The short period, such as a few months, of the forecast can cause problems, and the fact there is no exact methodology to the forecasting may lead to results that may be difficult to duplicate and may be prone to errors.

Accordingly, it is desirable to provide an apparatus and technique of forecasting the composition of a fleet of aircraft, aircraft retirements and fleet spares requirements in a controlled and efficient manner.

SUMMARY OF THE DISCLOSURE

The foregoing needs are met, to a great extent, by embodiments of this disclosure, wherein in one aspect an apparatus is provided that in some embodiments of forecasting the composition of a fleet of aircraft, aircraft retirements and fleet spares requirements in a controlled and efficient manner.

In accordance with one embodiment of the disclosure, a method for forecasting aircraft fleet composition, aircraft retirements and fleet spares requirements, includes obtaining aircraft fleet data, obtaining data on independent variables, determining an indicator of economic and business environment, determining the operation type of the aircraft, estimating the model using certain estimation steps using the aircraft fleet data, examining and updating the model based on changes in the independent variables, and forecasting on a year-to-year basis by age and operation cohort.

There can be certain estimation steps being discrete choice theory. The independent variables can include at least one of fuel price, age of individual aircraft, and exogenous economic shocks. The indicator of economic and business environment can be a cycle indicator that can be in a range from 2 to 20 years. The operation type includes any one of a cargo, passenger, and business. There can be updating the model being based on aircraft fleet data.

The forecasting can be automatically performed in a software program accessing databases with the aircraft fleet data and the independent variables. The independent variables can also include the fleet size and age of the aircraft. The method can be executable on a computer readable media.

In accordance with another aspect of the disclosure, an apparatus for forecasting aircraft fleet composition, aircraft retirements and fleet spares requirements, includes a memory unit storing software for execution of instructions, the memory unit storing obtained aircraft fleet data, and data on independent variables, and a processor connected to memory executing the instructions stored in the memory including determining an indicator of economic and business environment, determining the operation type of the aircraft estimating the model using certain estimation steps using the aircraft fleet data, examining and updating the model based on changes in the independent variables, and forecasting on a year-to-year basis by age and operation cohort.

In accordance with yet another aspect of the disclosure, a system for forecasting aircraft fleet composition, aircraft retirements and fleet spares requirements, includes a means for obtaining aircraft fleet data, a means for obtaining data on independent variables, a means for determining an indicator of economic and business environment, a means for determining the operation type of the aircraft, estimating the model using certain estimation steps using the aircraft fleet data, a means for examining and updating the model based on changes in the independent variables, and a means for forecasting on a year-to-year basis by age and operation cohort.

There has thus been outlined, rather broadly, certain embodiments of the disclosure in order that the detailed description thereof herein may be better understood, and in order that the present contribution to the art may be better appreciated. There are, of course, additional embodiments of the disclosure that will be described below and which may form the subject matter of the claims appended hereto.

In this respect, before explaining at least one embodiment of the disclosure in detail, it is to be understood that the disclosure is not limited in its application to the details of construction and to the arrangements of the components set forth in the following description or illustrated in the drawings. The disclosure is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

BRIEF DESCRIPTION OF THE DRAWINGS

FIG. 3 is a data input sample.

DETAILED DESCRIPTION

Embodiments of the disclosure will now be described with reference to the drawing figures, in which like reference numerals refer to like parts throughout. An embodiment in accordance with the present disclosure provides a technique of forecasting the fleet composition and the retirement of aircraft in an accurate and efficient manner. The present disclosure applies discrete choice theory to interpret and predict fleet decisions with regard to in-service fleet, parked aircraft, and retirements of a specific aircraft type, from a set of attributes such as and without limitation the aircraft's age, technical and economic obsolesce, fuel efficiency, its type of operation and an indicator of the operator's business environment.

The disclosure provides high-resolution forecasts of the in-service fleet, parked fleet and retirements, one for each of the major aircraft types, e.g., BOEING 727, BOEING 737 Classics, BOEING 767, MD80/90 (McDonnell Douglas is a division of BOEING), AIRBUS A300, AIRBUS A320, and LOCKHEED L-1011, etc.

The fleet size and aircraft's age are two important factors driving the need for spare parts. The larger the fleet or the older the aircraft, the higher the need for spares. Moreover, due to aging, even for the same fleet size and utilization, an older fleet may need more spares, or spare parts, than a younger one. Embodiments of the disclosure may provide a fleet and retirement forecast by aircraft's delivery year to capture the collective effects of fleet size and the aircraft age and the disclosure accommodates the need.

Among the challenges in analyzing aircraft retirements are the diverse definitions and criteria that characterize for the term "retirements". For instance, from a passenger service point of view, an aircraft may be retired once it has been converted into a freighter. Whereas from the operator's view, an aircraft may be considered as retired when it is withdrawn from the operator's fleet through operator transfer. From an aggregate fleet perspective, an aircraft is retired when it is permanently withdrawn from service. Therefore, a definition of aircraft retirement is a noteworthy point. An aircraft life cycle model may be introduced to illustrate the fleet evolution and define aircraft retirements.

Figure 1:
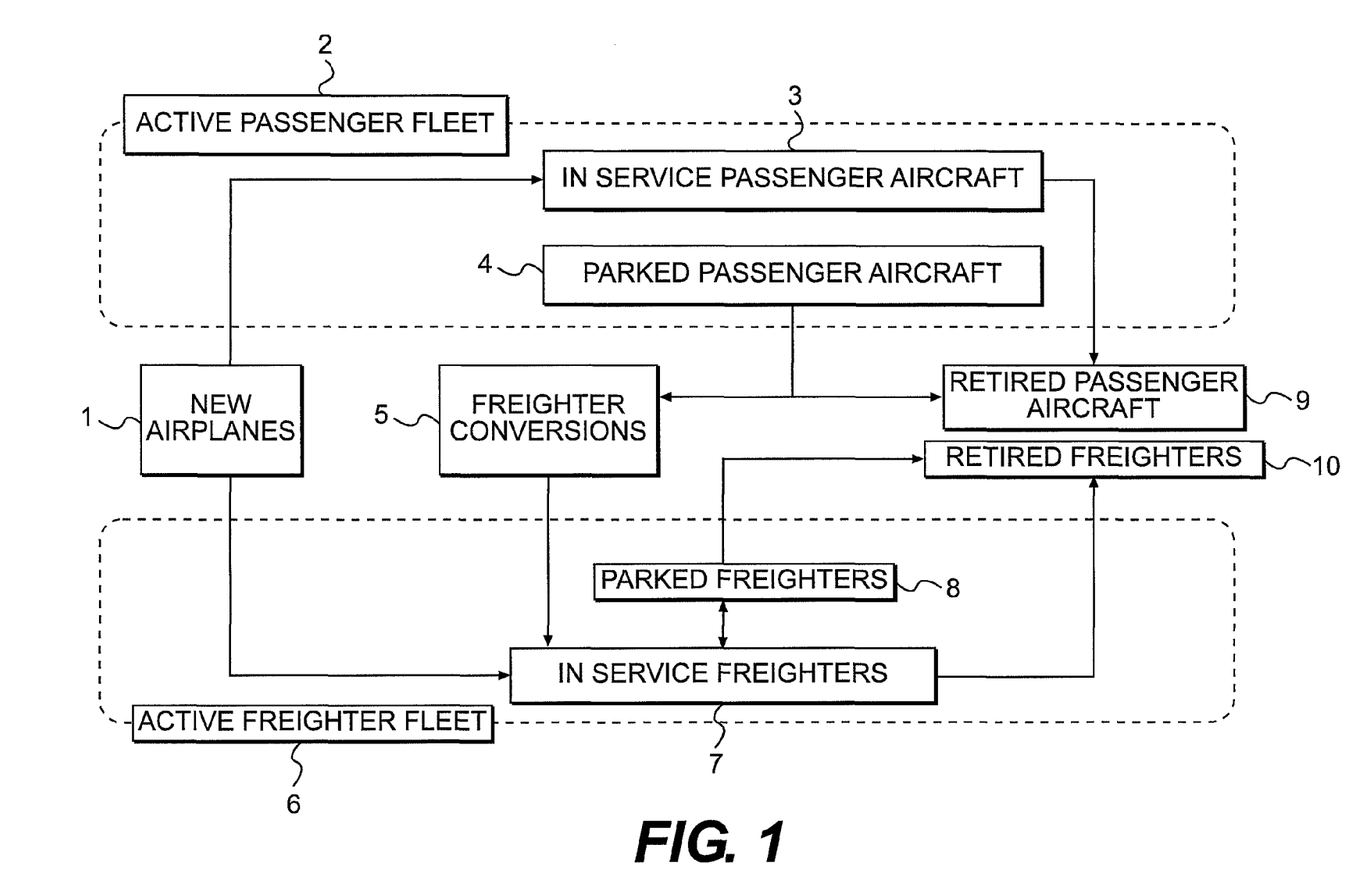
FIG. 1 is a system view of an aircraft life cycle.

Referring to FIG. 1, it represents a system view of the typical aircraft life cycle and the dynamics within the fleet. Over time, new aircraft may be added to the commercial fleet to fulfill the need for, for example and without limitation fleet growth as well as for capacity replacement.

As seen in FIG. 1, the new delivery 1 goes either to in-service passenger fleet 3 or in-service freighter fleet 7. The active passenger fleet 2 is the sum of the in-service passenger aircraft 3 and the parked passenger aircraft 4. During the aircraft's life, the in-service passenger aircraft 3 can become parked 4 and vice versa. After years of operation, majority of passenger aircraft, both in-service 3 and parked 4, become scrapped passenger aircraft 9, i.e., permanently withdrawn from passenger services. However, some passenger aircraft may take the path of freighter conversions 5, which will then add to the in-service freighters 7. Like passenger fleet, the active freighter fleet 6 is the sum of the in-service freighter aircraft 7 and parked freighters 8; the in-service freighter 7 can become parked 8 and vice versa; and finally, after years of operations, both in-service 7 and parked 8 freighters become scrapped freighters 10, permanently withdrawn from freight services.

FIG. 1 reflects many changes that may occur within the fleet. Both passenger and freighter aircraft can be sold, leased or otherwise transferred to other commercial operators, or can be parked for many reasons including maintenance, major and/or minor modifications or upgrades, conversions, and ownership transitions to name a few. The duration that aircraft may be parked varies and depends not only on without limitation the reasons for parking, but also on the age and condition of the aircraft, model types, and airline and market conditions. As aircraft age, they reach the point where they are no longer economically viable to operate, and are eventually retired from the fleet. In the context of this disclosure, aircraft retirements are aircraft that are permanently withdrawn from passenger or freight services for any reason, including voluntary withdrawal from service, losses, accidents and sustained damage. By this definition, aircraft transitions between operators and/or freighter conversions are not retirements. The retirements result primarily of aircraft being scrapped.

Without limitation, aircraft age, parking duration, usage, operator's region, flight hours and cycles, and technology are important factors for the active fleet. Airplane age, flight hours and cycles, technology advantage and major modifications such as hushkits, re-engining and freighter conversions are airplane product-related attributes of the active fleet. The airplane usage, parking duration and operator's geographical location are airplane operation related attributes of the active fleet. Both product-related and operation-related attributes are also important factors influencing airplane retirements and driving airlines' fleet decisions.

Figure 2:
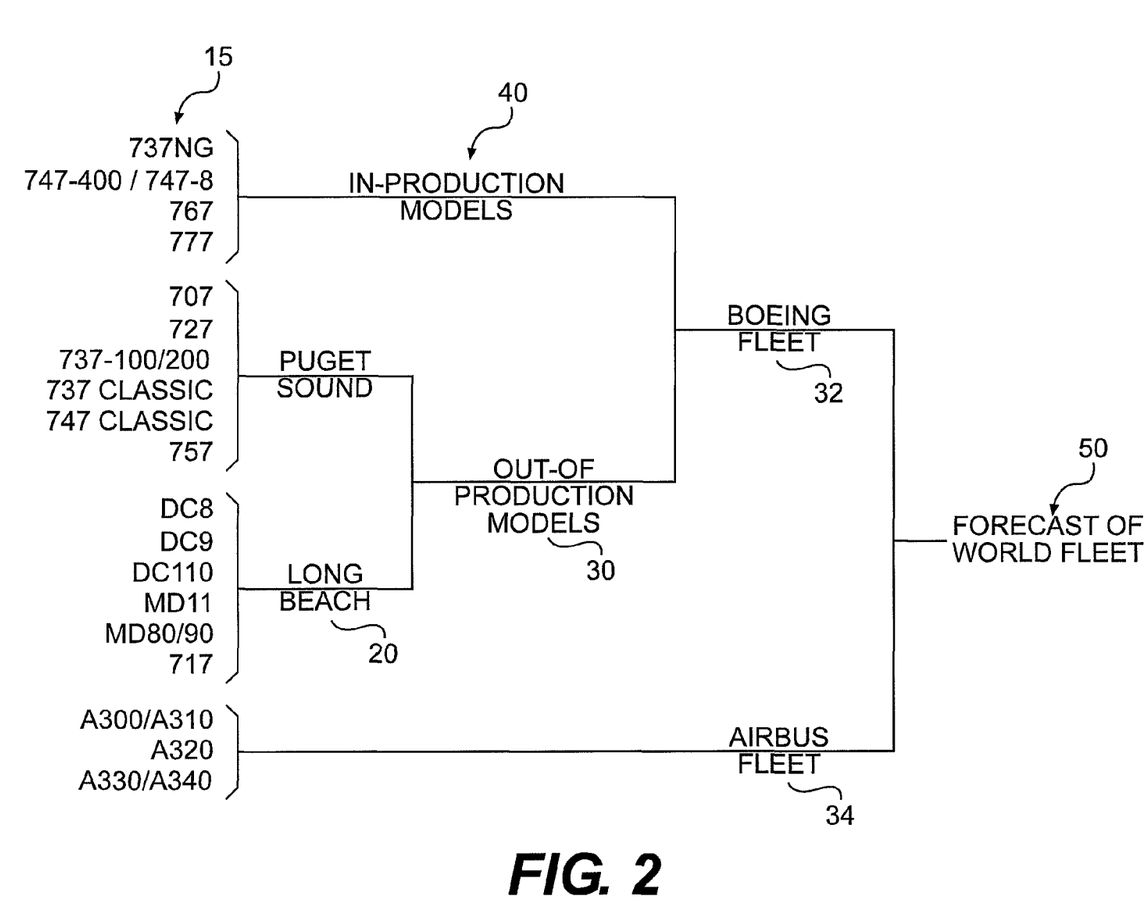
FIG. 2 is an illustration of the near term fleet forecast.

Referring to FIG. 2, the near-term fleet forecast is shown without limitation with example types of air vehicles 15 such as the BOEING 727. The types of air vehicles are then grouped by geographical location of manufacture 20, such as Puget Sound and Long Beach. Different groupings rather than or including location of manufacture 20 can be made. Then the model groups the aircraft by in-production models 40 and out-of-production models 30 of manufacturer. The combination of the in-production models 40 and the out-of production models 30 come together as the near-term fleet forecast 32 of a manufacturer. Fleet forecasts of various manufacturers, for example, forecasts of Boeing fleet 32 and Airbus fleet 34, are then grouped into the world aggregate fleet 50.

The data sources can include data for the aircraft history. The data sources can be, for example, data by AIRCLAIMS Ltd. for airplane history or other databases that provide the airplane history, for example, ACAS data and Boeing Reliability and Maintainability data that provides delivery dates of airplanes to align with data records of airplane flight hours.

The fleet composition and airplane retirements are the results of operators' decisions, that is, each year airplane operators make decisions on their active fleet, the sum of airplanes in-service and parked, and decide whether they would fly, park, or scrap (retire) them the next year. For airplanes being scrapped, they're no longer subject to further monitor as they are considered as been physically withdrawn from the services. For airplanes remaining active, either in-service or parked, their service histories will continue to be monitored and operators will continue to make decisions each year until they're scrapped. Whenever making decisions, operators can choose from one of the three alternatives, e.g., remaining the airplane in-service, parking the airplane, or scrapping (retiring) it. Applying the discrete choice theory, the near-term fleet choice model considers alternatives such as the aircraft being in-service, parked or scrapped (e.g., retired), and the probability of multinomial logit choice model is as follows:

$$\text{Probability}\{in\_service, park, scrap\} = \frac{e^{V_i}}{\sum_j e^{V_j}}$$

The sum of the probabilities would then be 1.

The general specification of the utility function $V_i$ is as follows:

$V_i = a + b1*[\text{Age}] + b2*[\text{Operation Type}] + b3*[\text{Cycle}] + b4*[\text{Global Exogenous Shock}] + b5*[\text{Fuel Efficiency of passenger Operation}] + b6*[\text{Fuel Efficiency of Other Operations}]$ The freighter conversion can also be included as a choice alternative. As seen in the utility function ($V_i$), the aircraft age, operation type, cycle, global exogenous shocks, fuel efficiency of the passenger operation and the fuel efficiency of other operations are independent variables that can be taken into account, and the observed part of the utility function is set to be linear in parameters with a constant. Definitions of the independent variables and calculation of their values are elaborated below, along with an example of data input shown in FIG. 3 for an aircraft such as the MD 80/90.

The aircraft age is defined as its age by year end of the decision year since its delivery. As the invention hypothesizes the operator makes the decision about the airplane each year as long as it is in-service or parked, its age is calculated as the decision year subtracting its year of delivery. Both decision year and the airplane's year-of-delivery can be obtained from the aircraft history which can be extracted from the aforementioned data sources. Referring to FIG. 3, age 102 of an airplane of model 112 is calculated from the delivery year 114 and the decision year 115.

The operation type is a Boolean variable indicating the aircraft's usage. It would be 1 for passenger operation and 0 for operations otherwise, for example, cargo or business operations. Information of the aircraft usage across the years can be obtained from the aircraft history and is usually in the descriptive format, for example, passenger, freighter, or business usage. Numerical values of the operation-type independent variable can then be determined based on the definition accordingly. Shown in FIG. 3, the aircraft has been in passenger operation since its delivery, values of operation type, Pax 104, have always been 1.

The cycle is an indicator of the varying airline's economic and business environment over the time. It can be a sine function with, for example, a 10 year wave length, based on the study of profit cyclicality of the airline industry. The cycle of 10 years is given as an example and is not limited to such an example. For instance, it can also be in a range between 2 and 20 years, or be indexes drawn from other econometric variables, such as, Consumer Price Index, or GDP. Referring to FIG. 3, values of cycle 106 are calculated based on a 10-year sine function.

The global exogenous shock is a Boolean variable identifying the time period during which an unpredictable global exogenous shock, for example, oil shock, war, terrorist attack, etc., took place and had a severe impact to air transportation worldwide. The global exogenous shock can be 1 for the years when major global exogenous shocks occurred after 1950 or 1980 or whatever year is selected, for example, and without limitation; and 0 otherwise for the years of no shocks. Values of the global-exogenous-shock independent variable are determined based on the impact of major events and the aftermath on air transportation; for example, as shown in FIG. 3, shock 108 in 2001-2003 are defined as 1 due to the severe impact of the 911 terrorist attacks worldwide.

The fuel efficiency of passenger operation measures the aircraft's competitiveness and/or its technical/economic advantage in the market over the years. The fuel efficiency can be considered only after the airplane model is out of production, which implies that more modern and better competing products are likely in production and can replace them. Measurements of the fuel efficiency can be oil prices in the years after the production termination, and 0 when the airplane model is in production which indicates it is the most efficient airplane in that time frame. Referring to FIG. 3, oil prices and production status are shown in 110, of which, sunset values are defined as 0 in 1980-2000 when model 112 (MD80/90) was in production and 1 afterwards when it went out of production. The value of the fuel-efficiency-of-passenger-operation variable is then defined as the multiplication of operation type (pax 104) and oil prices and sunset 110. For example, values of the fuel-efficiency-of-passenger-operation variable of the airplane shown in FIG. 3 are 0's in 1980-2000 and oil prices in 2001 and onward.

Similarly, the fuel efficiency of other operations can be defined for airplanes in operations other than passenger as the multiplication of operation type and oil prices and sunset.

Also shown in FIG. 3 are the historical observations of the airplane's status 116 and the dependent variable choice 101, the corresponding revealed preferences. Airplane status can be obtained from the aircraft history and choices can then be identified accordingly. Referring to FIG. 3, for example, the in-service status has the choice ID of 1 while parked has choice ID of 3. Referring to FIG. 3, the revealed preferences plus the independent variables described above, are then used to estimate the coefficients a, b1, b2, b3, b4, b5, and b6 in the general utility function $V_i$. Other independent variables can be used, and those in FIG. 3 are only shown as an example and are not limiting.

The coefficients b1, b2, b3, b4, b5, and b6 in the general utility function $V_i$ define the contribution of respective independent variable, b1 for aircraft age, b2 for operation type, etc., to the likelihood of each alternative being chosen: in-service, park, or scrap; and the coefficients of a, alternative specific constant (ASC), define the average effect on the utility of all factors that are not included in the model.

Depending on the characteristics of airplane products, utility functions of individual airplane model can be simplified from the general form. For example, as most MD80/90s are in passenger operations, independent variables that distinguish operation type and fuel-efficiency of other operations can be omitted; consequently, coefficients b2 and b6 can be set to 0 respectively and do not need to be estimated.

Figure 4:
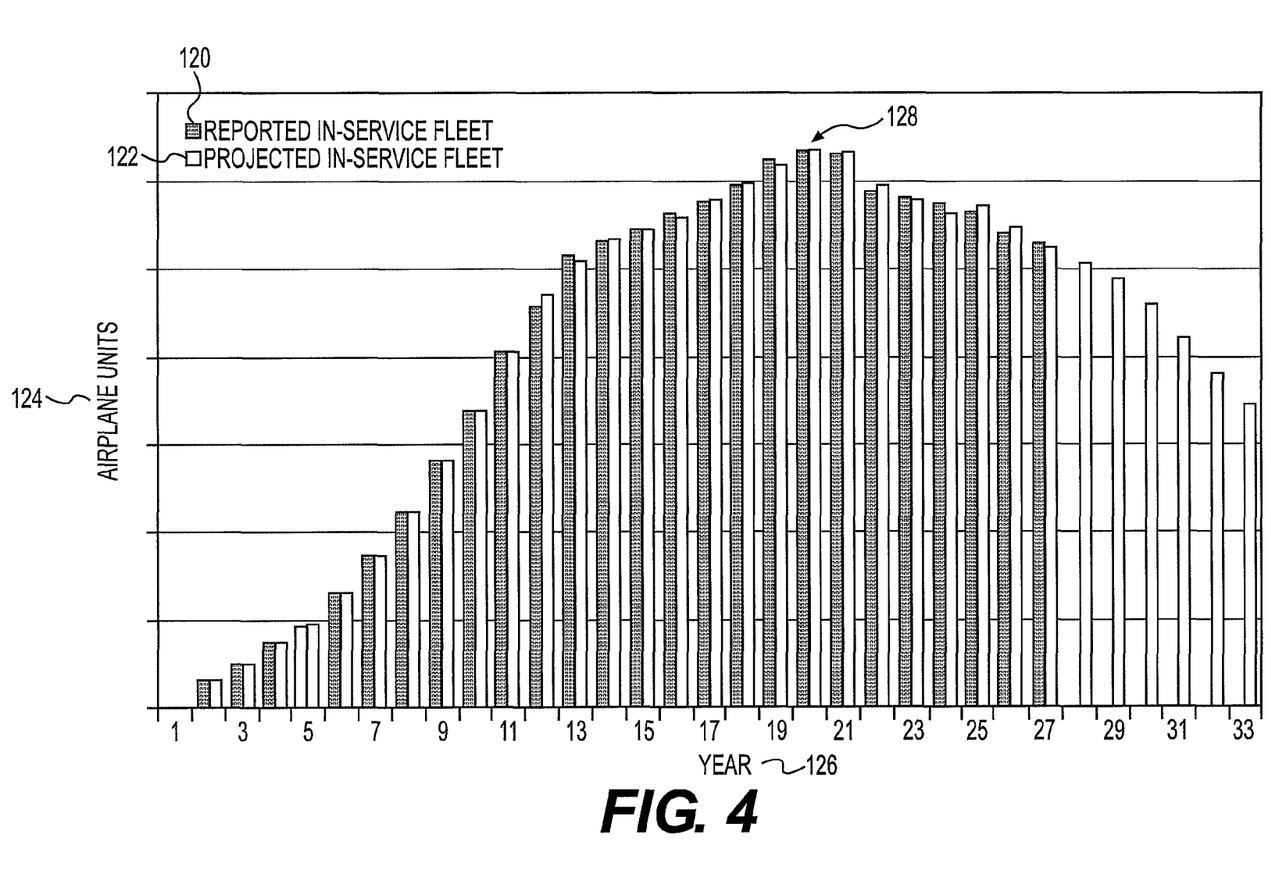
FIG. 4 is an illustration of the fleet model calibration and forecast.

By applying the discrete choice theory, the coefficients can be estimated using the maximum likelihood estimator via iterations between specifying the utility functions and evaluating the overall likelihood of the revealed preferences. When a set of coefficient estimates is obtained, the utility of each alternative can be calculated according to the general form specified above, and the probability (likelihood) of each alternative can be determined. An optimal set of coefficient estimates is likely to achieve when the collective likelihood of the revealed preferences approximates maximum and all coefficient estimates are statistically significant. The maximum likelihood represents that the calculated probabilities best matches the preferences revealed in the historical data, Above obtained coefficient estimates may be used to verify the choice model. FIG. 4 shows the calibration of the in-service fleet of one aircraft type, in which, the reported in-service fleet data 120 is graphed with the projected in-service fleet data 122, with the airplane units 124 being plotted versus the year 126 of the data. As seen in FIG. 4, the projected numbers are close to the reported as seen in year 1 to year 27; for example in year twenty 128, the projected in-service fleet data 122 is almost the same as the reported in-service fleet data 120.

The close approximation between the projected fleet data and reported fleet data in history gives the confidence that the estimated model may be able to accurately forecast the fleet composition and airplane retirements in the future. The first step in forecasting is to obtain the projections of independent variables. As for the airplanes remaining in-service or parked, their ages are becoming one year older. The values of the operation type this year can extend to the next year assuming no change to the airplane's operation; however, one could also specify the switch of operation type. The cycle variable can be calculated given the forecasting year. The global exogenous shock in general is set to 0 assuming no shocks in the forecasting horizon; however, one could also flag certain years if necessary. The fuel efficiencies can be calculated from the operation type, future oil prices and future production status. The future oil prices can be obtained from external sources or self-defined. The production status of specific airplane type can assume no change to the latest status or expect certain change in the forecasting horizon. Substituting the forecasts of the independent variables and the coefficients estimates into the general utility function shown above, the utility of each alternative $V_i$ in forecasting years can be calculated, and probability of each alternative can also be determined from the previous probability equation. The fleet composition and airplane retirements are projected as expected fleet values in forecasting period for given probabilities. FIG. 4 also illustrates the projected in-service fleet 122 of one aircraft type in year 28 to year 33.

Figure 5:
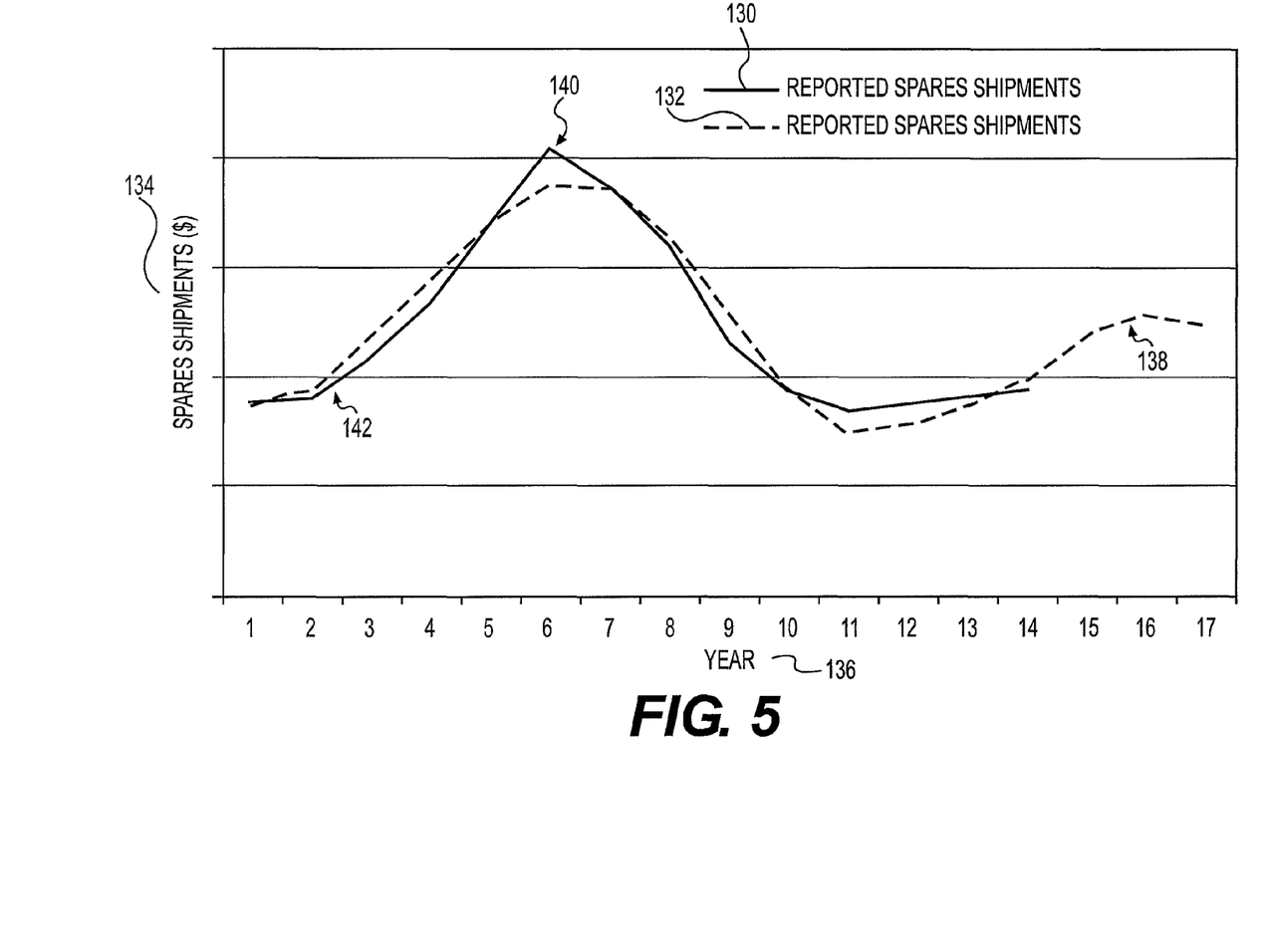
FIG. 5 illustrates the forecast of the spares shipments.

Referring to FIG. 5, the spares shipments forecast is illustrated, for example, the spares of one group formulated by location or production status. Forecasts of spares can be driven by the fleet size and age of the aircraft. As seen in the comparison, the reported 130 and the projected shipments 132 are closely aligned from year 1 through year 14, and thus may allow for accurate projected spares shipments in the future years. FIG. 5 plots the spares shipments 134 with the year 136. As can be seen in year three 142, the projected 132 and the reported 130 spares shipments are close, but in year six 140 there is a slight divergence, and finally in year fifteen 138, a forecast is made of using the model.

Figure 6:
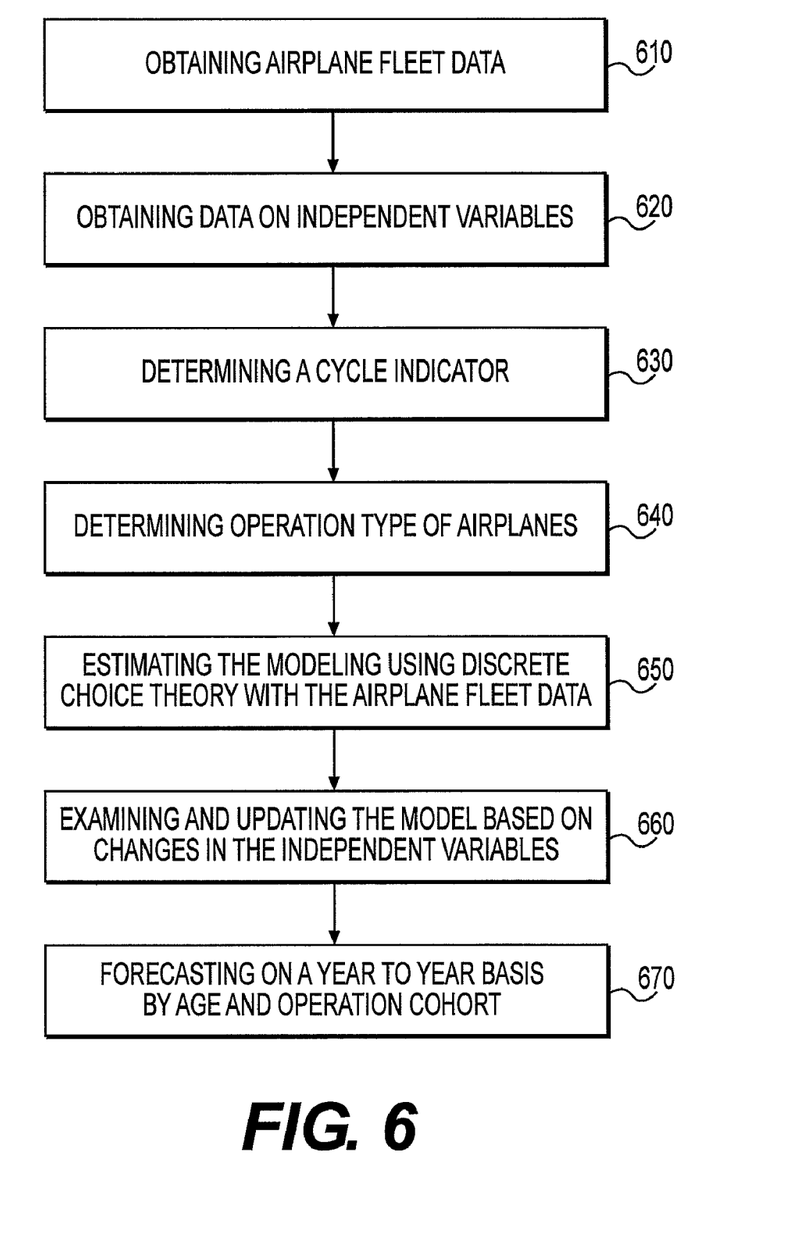
FIG. 6 is a flow diagram illustration of the steps to forecast aircraft retirements and fleet composition.

Referring to FIG. 6, the forecast can be performed in the following manner. The forecasting process includes the steps of collecting and analyzing data, estimating and evaluating fleet models, collecting forecast of independent variables and forecasting fleet composition and aircraft retirements. First, by obtaining aircraft fleet data (step 610). The fleet data can be stored in a memory unit, for example and without limitation, or obtained via visual presentation such as display or other media. Then, there is analyzing of the fleet data to obtain and define numeric values of independent variables (step 620). The independent variables can be obtained from and without limitation a memory unit or again a display device or media. The independent variables, for example, can be age of individual aircraft, operation type, global exogenous shocks, and fuel prices during the decision years. Thereafter, there is determining the indicator of the airline's economic and business environment, for example, a cycle indicator (step 630). Another type of index could also be used. The cycle indicator can be determined or preset. Then there is determining the operation type of the aircraft (step 640). The operation type can be, for example without limitation, cargo, passenger, or business.

After assembling all the independent variables, there is estimating the model using certain discrete theory based on the aircraft fleet data that was obtained earlier (step 650). After obtaining a model specification, there is examining the model specification and collecting forecasts of independent variables in the models (step 660). The model estimation and evaluation can be an iterative process until a satisfactory model specification is obtained. Finally, there is a forecasting of the fleet composition and aircraft retirements (step 670), which is projected by age and operation cohort, on a year-over-year basis, e.g., the current year's fleet forecast is projected from the basis of prior year's active fleet, aircraft remaining in-service or parked by last year end.

The present disclosure can be realized as computer-executable instructions in computer-readable media. The computer-readable media may include all possible kinds of media in which computer-readable data is stored or included or can include any type of data that can be read by a computer or a processing unit. The computer-readable media may include for example and not limited to storing media, such as magnetic storing media (e.g., ROMs, floppy disks, hard disk, and the like), optical reading media (e.g., CD-ROMs (compact disc-read-only memory), DVDs (digital versatile discs), re-writable versions of the optical discs, and the like), hybrid magnetic optical disks, organic disks, system memory (read-only memory, random access memory), non-volatile memory such as without limitation flash memory or any other volatile or non-volatile memory, other semiconductor media, electronic media, electromagnetic media, infrared, and other communication media such as carrier waves (e.g., transmission via the Internet or another computer). Communication media may generally embody computer-readable instructions, data structures, program modules or other data in a modulated signal such as without limitation the carrier waves or other transportable mechanism including any information delivery media. Computer-readable media such as without limitation communication media may include wireless media such as without limitation radio frequency, infrared microwaves, and wired media such as a wired network. Also, the computer-readable media can store and execute computer-readable codes that are distributed in computers connected via a network. The computer readable medium also may include without limitation cooperating or interconnected computer readable media that are in the processing system or are distributed among multiple processing systems that may be local or remote to the processing system. The present disclosure can include the computer-readable medium having stored thereon a data structure including a plurality of fields containing data representing the techniques of the present disclosure.

Figure 7:
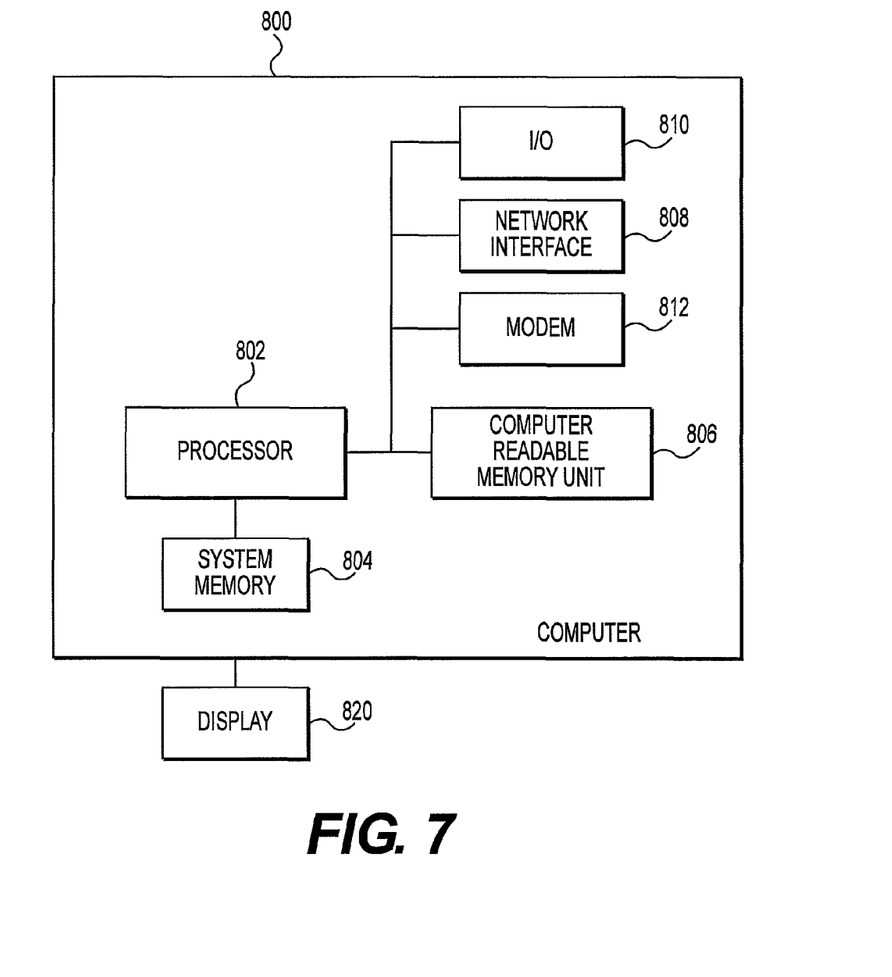
FIG. 7 is a block illustration diagram of a computer with computer executable media used to automatically or semi-automatically execute the steps of FIG. 6.

An example of a computer, but not limited to this example of the computer, that can read computer readable media that includes computer-executable instructions of the present disclosure is shown in FIG. 7. The computer 800 includes a processor 802 that controls the computer 800. The processor 802 uses the system memory 804 and a computer readable memory device 806 that includes certain computer readable recording media. A system bus connects the processor 802 to a network interface 808, modem 812 or other interface that accommodates a connection to another computer or network such as the Internet. The system bus may also include an input and output interface 810 that accommodates connection to a variety of other devices. Furthermore, the computer 800 can output through, for example, the I/O 810, data for display on a display device 820.

The present disclosure can be performed manually by manually entering the aircraft fleet data and independent variables into the estimation model and forecasting. The forecasting can also be determined manually through calculation of the data inputted using the model.

However, the embodiments can also be performed automatically, through, for example, the computer of FIG. 7. The aircraft fleet data of step 610 in FIG. 6 can be stored and obtained from the computer readable memory unit 806. The data on the independent variable of step 620 can be also obtained from a database stored in the computer readable memory unit 806. Software stored on the computer readable media 806 and executed by the processor 802 can then determine the cycle indicator of step 630 and the operation type of the aircraft in step 640. Then, the processor 802 can execute the steps in the software to use the fleet data obtained from the computer readable memory unit 806 for estimating the model in step 650. Then the processor 802 can execute through the instructions in the software to update the model based on the independent variable data obtained from the computer readable memory unit 806 in step 660. Finally the processor 802 through the instructions stored in the computer readable media 806 can forecast on a time basis according to the age and operation cohort or other variables.

The many features and advantages of the disclosure are apparent from the detailed specification, and thus, it is intended by the appended claims to cover all such features and advantages of the disclosure which fall within the true spirit and scope of the disclosure. Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A method for forecasting aircraft fleet composition, aircraft retirements and fleet spares requirements, comprising the steps of:
   obtaining aircraft fleet data;
   obtaining data on independent variables;
   determining a cycle indicator;
   determining the operation type of the aircraft;
   estimating a fleet model according to discrete choice theory by using the aircraft fleet data;
   examining and updating the fleet model based on changes in the independent variables;
   forecasting the aircraft fleet composition on a year-to-year basis by age and operation cohort; and
   at least one of the steps of forecasting being performed by a computer processor.

2. The method of claim 1, wherein the independent variables include at least one of fuel price, age of individual aircraft, and economic shocks.

3. The method of claim 1, wherein the cycle indicator is in a range from 2 to 20 years.

4. The method of claim 1, wherein the operation type includes any one of a cargo, passenger, and business.

5. The method of claim 1, wherein the step of updating the fleet model is based on aircraft fleet data.

6. The method of claim 1, wherein the independent variables include the fleet size and age of the aircraft.

7. An apparatus for forecasting aircraft fleet composition, aircraft retirements and fleet spares requirements, comprising the steps of:
   a memory unit storing software for execution of instructions, the memory unit storing obtained aircraft fleet data, and data on independent variables; and
   a processor connected to memory executing the instructions stored in the memory including:
   determining a cycle indicator:
   determining the operation type of the aircraft:
   estimating a fleet model using discrete choice theory using the aircraft fleet data:
   examining and updating the fleet model based on changes in the independent variables: and
   forecasting the aircraft fleet composition on a year-to-year basis by age and operation cohort.

8. The apparatus of claim 7, wherein the independent variables include at least one of fuel price, age of individual aircraft, and economic shocks.

9. The apparatus of claim 7, wherein the cycle indicator is in a range from 2 to 20 years.

10. The apparatus of claim 7, wherein the operation type includes any one of a cargo, passenger, and business.

11. The apparatus of claim 7, wherein the step of updating the model is based on aircraft fleet data.

12. The apparatus of claim 7, wherein the step of forecasting is automatically performed in a software program accessing databases with the aircraft fleet data and the independent variables.

13. The apparatus of claim 7, wherein the independent variables include the fleet size and age of the aircraft.

* * * * *